United States Patent Office 2,939,886
Patented June 7, 1960

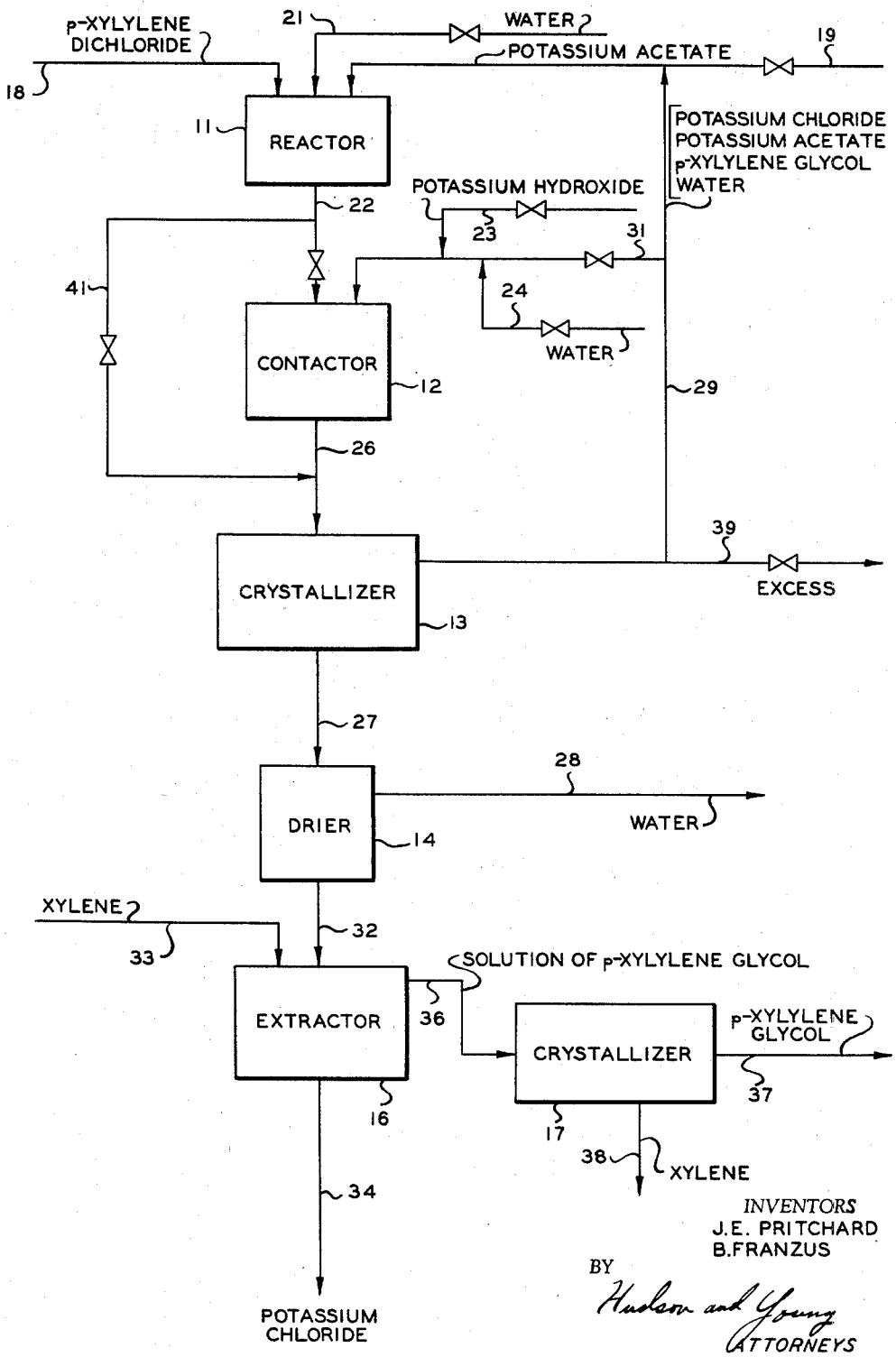

2,939,886
PROCESS FOR THE PRODUCTION OF XYLYLENE GLYCOLS

James E. Pritchard and Boris Franzus, Bartlesville, Okla., assignors to Phillips Petroleum Company, a corporation of Delaware Filed Jan. 9, 1957, Ser. No. 633,366

2 Claims. (Cl. 260—618)

This invention relates to an improved process for the production of xylylene glycols whereby high yields of the glycol can be obtained with little or no loss of the reactant to by-products.

The glycols are well known and provide the materials from which esters and ethers thereof are produced. These esters and ethers are used as plasticizing agents for cellulose esters and ethers and synthetic resins, particularly those produced by condensation of aldehydes with partially hydrolyzed polymerization products of vinyl esters.

The production of glycols in general by hydrolysis of salts, or by saponification with alkalies is old in the art. However, we have discovered that there are certain factors to be controlled when producing xylylene glycols, in order to obtain good yields of the glycol, or, indeed, to obtain an operable process at all. When these factors are not considered the process may not be operable or there can be produced a polymeric side product, with a consequent loss of reactant available for production of the glycol.

The following are objects of this invention:

An object of this invention is to provide an improved process for the production of xylylene glycols. A further object of this invention is to provide a process for the production of these glycols from hydrolyzable $\alpha,\alpha'$-substituted xylenes in the presence of metal salts of weak acids whereby improved yields are obtained with practically no loss of the reactant to by-products.

Other objects of this invention will be apparent to one skilled in the art upon reading this disclosure.

Accompanying and forming a part of this application is a block flow diagram illustrating one embodiment of our invention.

This invention relates to the preparation of the otho-, meta-, and para-xylylene glycols or $\alpha,\alpha'$-xylylenediols from the corresponding $\alpha,\alpha'$-substituted xylenes wherein the substituents are reasily replaceable. These substituents include, among others, the halogens, such as chlorine, bromide, iodine and fluorine, and other replaceable groups, such as p-toluenesulfonate, p-bromobenzenesulfonate, etc. Typical examples of these xlyenes include p-xylylene dichloride, o-xylylene dibromide, m-xylylene diiodide, p-xylylene difluoride, p-xylylene di-(p-toluenesulfonate) and p-xylylene di-(p-bromobenzenesulfonate).

These glycols are preferably prepared from the chlorine substituted xylenes. One suitable method for the production of these derivatives is disclosed in copending application of James E. Pritchard, Serial No. 503,801, filed April 25, 1955, now Patent 2,814,649, wherein xylene is chlorinated in the presence of chlorine gas or other strong chlorinating agent in the presence of light, particularly ultra-violet light, and/or a free radical catalyst such as an organic peroxide or hydroperoxide, the resulting dichloride being recovered by selective crystallization by introducing the reaction products into a cold paraffinic solvent, the temperature being room temperature or below. The chlorination is carried out by introducing the chlorine into the xylene at a temperature in the range of 180 to 280° F., over a time of 0.3 to 3 hours in the presence of 0.05 to 1 weight percent catalyst based on the weight of the xylene. Suitable catalysts include benzoyl peroxide, diisopropylbenzene hydroperoxide, cumene hydroperoxide, and the like. In general, the maximum amount of the desired dichloride is formed when appproximately 1.5 mol of chlorine per mol of xylene is used. The chlorinated product, containing xylene dichloride as well as unchlorinated and monochlorinated material, is introduced into a saturated acyclic hydrocarbon at a temperature in the range of 0 to 80° F., sufficient solvent being used to dissolve the unchlorinated and monochlorinated material. Examples of these solvents include normal pentane, isopentane, normal heptane, the various octanes, decanes, and the like. The xylene dichloride is recovered as a crystalline product.

One problem in the hydrolysis of these substituted xylenes with water is the sublimation of the reactant. At attempted hydrolysis of p-xylene dichloride in water at atmospheric pressure and a temperature of 100° C. led to complete sublimation of the dichloride. When conducted in the presence of a salt of a weak acid, however, the glycol was produced. In order to eliminate the formation of polymeric material in the reaction mixture, it is also necessary to have an initial pH of the reaction mixture of not over 10. We prefer a pH within the range of 7 to 10 but an initial pH of as low as 2 can be used. We We maintain this condition by hydrolyzing a substituted xylene, such as a xylyene dihalide, in the presence of a water soluble metal salt of a weak acid. Examples of such salts niclude, among others, sodium acetate, potassium acetate, barium acetate, sodium acid carbonate, sodium monohydrogen orthophosphate, sodium propionate, sodium benzoate, sodium tetraborate, and the like. In place of the metal salt we can add its equivalent, such as acetic acid and sodium hydroxide which would be equivalent to the soduim acetate. The preferred salts of weak acids are those which have a high water solubility and a low equivalent weight.

The process is carried out by adding one of the substituted xylenes above, such as p-xylene dichloride, water, and the metal salt or its equivalent to a reactor which is lined with glass, resin ware, or othersuitable non-metallic material. In order to obtain a clean product and obviate undesirable side reactions, the reaction should not be conducted in a metal reactor. Of course, mixtures of the sustituted xylenes can be used. After addition of the reactants, the reactor contents are heated to temperatures generally in the range of 20 to 200° C., preferably 100 to 150° C. The reaction pressure should be sufficient to maintain a liquid phase reaction. Thus, pressures from atmospheric to superatmospheric can be employed. In order to obtain desirable reaction rates the solution of the metal salt of a weak acid in the reactor should be in the range of 0.1 to 4 molar. As stated, this salt should preferably be in an amount sufficient to give an initial pH of 7 to 10 in the reaction mixture. With salt concentrations in this range the reaciton time will generally be in the range of 5 to 100 hours.

After the reaction, the product is separated and purified. If the anion of the salt of the weak acid which is used can itself displace the substituent groups on the $\alpha,\alpha'$-substituted xylene, such as sodium acetate, then the reactor effluent is contacted with an alkali in order to obtain the xylylene glycol. One method of then separating the xylylene glycol is by crystallization. When using the salt of a weak acid which does not substitute in this manner, such as sodium acid carbonate, the glycol can be recovered from the reaction mixture by cooling to crystallize the glycol and salt. The glycol is then recovered by dissolving in an organic solvent such as xylene and dichloroethylene and recrystallization from said solvent.

In the accompanying block flow diagram, a specific embodiment of our invention is shown. The components include a reactor 11, a contactor 12, a first crystallizer 13, a drier 14, an extractor 16, and a second crystallizer 17. In the process, para-xylylene dichloride is fed to reactor 11 by means of conduit 18 along with potassium acetate through conduit 19 and, at start-up, water through conduit 21. After sufficient reaction time, the reactor effluent is passed by means of conduit 22 to contactor 12 wherein the ester formed in reactor 11 is hydrolyzed by the addition of a solution containing potassium hydroxide supplied by means of conduit 23. During start-up water is supplied to contactor 12 by means of conduit 24. The effluent from contactor 12 is passed to crystallizer 13 by means of conduit 26. By reduction in temperature, the desired glycol and potassium chloride are crystallized in crystallizer 13 and are passed by means of conduit 27 to drier 14 from which water is removed through conduit 28. The liquid phase from crystallizer 13, containing potassium chloride, potassium acetate, para-xylylene glycol, and water, is passed by means of recycle conduit 29 to reactor 11, this conduit communicating with conduit 19. Conduit 31 connects conduits 29 and 23 so that the liquid recycle stream can be used to carry the potassium hydroxide to contactor 12.

The solid material from drier 14 is passed to extractor 16 by means of conduit 32 wherein it is contacted with xylene supplied through conduit 33. The xylene dissolves the para-xylylene glycol leaving solid potassium chloride, the chloride being recovered through conduit 34. The solution of para-xylylene glycol is passed to the second crystallizer 36 by means of conduit 36. In crystallizer 17, the para-xylylene glycol is separated from the xylene, the glycol being recovered through conduit 37 and xylene in conduit 38. If desired, a portion of the liquid in conduit 29 can be removed through conduit 39 and discarded or treated to recover any components thereof.

Conduit 41 is provided for by-passing contactor 12 when the salt of a weak acid is a material, such as sodium bicarbonate, which does not form an ester. In such a case, the reactor effluent can be passed directly to crystallizer 13 since there is no need for hydrolysis.

While we have shown recovery of the xylylene glycol by crystallization from the contactor effluent and from the extractor effluent, other methods can, of course, be used.

The following specific examples illustrate more completely the method of our invention.

*Example I*

To a quart bottle equipped with a stirrer, there was added 70 grams of p-xylylene dichloride, 85 grams of potassium acetate, and 500 milliliters of water. The bottle was sealed and the reactants were heated to 135° C. The pH of the soultion at the start was 8.0. After 11 hours reaction time, the contents of the bottle were cooled to room temperature and the pH of the solution was determined to be 4.2. To the solution there was added 60 grams of sodium hydroxide and the solution was heated, with stirring, for 1 hour at 80° C. The solution was then poured into a beaker and upon cooling to room temperature a solid precipitated. The solid was filtered and weighed 35 grams and had a melting point of 104 to 113° C.

The filtrate was concentrated by evaporation and cooled, whereupon additional solid precipitated. This solid was recovered by filtration and air dried. The solid was extracted with xylene and redried. At this point, there was 15.4 grams of material. The total solid collected was recrystallized from xylene to give a final weight of 46.4 grams of p-xylylene glycol which had a melting point of 114 to 116.5° C. This represents a yield of pure glycol of 84.1 weight percent based on the quantity of p-xylylene dichloride charged.

*Example II*

To the quart bottle of Example I, there was added 70 grams of p-xylylene dichloride, 84 grams of sodium acid carbonate, and 550 milliliters of water. The pH of such a mixture is 8.4. The bottle was sealed and provided with a vent so that some pressure could be released when the pressure reached about 60 p.s.i.g. This was done for safety reasons. The reactants were maintained at a temperature of 135 to 140° C. for about 6.5 hours. Water was added to the reaction mixture and this mixture was heated. A small amount of yellow solid which remained was separated by filtration.

The water layer was concentrated by evaporation on a hot plate until some solid began to precipitate. The solution was cooled and the solid formed was separated by filtration. The solid was dried in air and recrystallized from xylene to give 31 grams of p-xylylene glycol which had a melting point of 115 to 117° C. This represents a yield of 56.3 weight percent based on the p-xylylene dichloride charged.

*Example III*

In order to demonstrate the adverse effect of a high pH on the reaction, 17 grams of p-xylylene dichloride, 21 grams of sodium carbonate, and 500 milliliters of water was added to a 2700 milliliter glass lined reactor. The pH of such a mixture is 11.6. The contents of the reactor were heated and maintained at a temperature of 173° C. for 24 hours. At the end of this time the reactor was cooled to room temperature and opened for examination. The sides of the vessel were coated with a polymeric material. Water was added to the reaction vessel to extract any occluded glycol.

The water solution from the reactor was continuously extracted with hot chloroform. Evaporation of this extract resulted in a recovery of 5 grams of p-xylylene glycol which melted at 115 to 118° C. The melting point of the solid after recrystallization from chloroform was 118.7 to 119.2° C. The yield of crude glycol was 36.2 weight percent based on the dichloride charged.

*Example IV*

In order to demonstrate the poor operability when using just water, 1.585 grams of p-xylylene dichloride and 500 milliliters of water were added to a 1-liter, 3-neck glass flask equipped with a stirrer, thermometer and reflux condenser. The contents were heated to 100° C. at atmospheric pressure. All the p-xylylene dichloride sublimed into the condenser with no glycol formed.

*Example V*

The sublimation of Example IV was eliminated when 420 grams of p-xylylene dichloride, 522 grams of potassium acetate and 3 liters of water were added to a 5-liter glass flask equipped with a stirrer, thermometer and reflux condenser. The contents of the flask were heated to 100° C. at atmospheric pressure and maintained at these conditions for 89 hours. At this point the reaction mixture was allowed to cool to approximately room temperature and then 360 grams of sodium hydroxide dissolved in one liter of water was added. The reaction mixture was refluxed for 5 hours and cooled to room temperature. This mixture was neutralized with acetic acid, heated, and filtered. After evaporation of a portion of the water, the mixture was cooled to crystallize the glycol. The yield was 325 grams of crude product and 275.3 grams of purified product.

*Example VI*

In this run, 17.5 grams of p-xylylene dichloride were added to 100 milliliters of glacial acetic acid. The solution was held at 115° C. for 88¼ hours. Analysis of the reaction mixture indicated that the dichloride had been solvolyzed (converted to the acetate) to an extent of 2.8 percent. Thus, it is evident that anhydrous acetic acid is not effective in forming the ester.

As many possible embodiments may be made of this invention without departing from the scope thereof, it is to be understood that all matter herein set forth is to be interpreted as illustrative and not in a limiting sense.

We claim:

1. A process for producing α,α'-p-xylylene glycol comprising mixing in a non-metallic reaction zone p-xylylene dichloride with an aqueous solution of potassium chloride, potassium acetate in a concentration in said reaction zone of 0.1 to 4 molar, and p-xylylene glycol obtained as hereinafter described at a pH within the range of 7 to 10, maintaining the reaction mixture at a temperature of 20 to 200° C. for a time of 5 to 100 hours, adding an aqueous solution of potassium hydroxide to the reaction mixture to hydrolyze esters formed, cooling the resulting mixture to crystallize a portion of the glycol and potassium chloride therein, returning at least a portion of the liquid phase recovered from the crystallizer to the reaction zone, drying crystallized glycol and potassium chloride, extracting dried glycol and potassium chloride with xylene to provide a solution of the glycol, separating the solution of glycol from the solid potassium chloride, and recovering the glycol from the xylene solution.

2. A process for producing α,α'-p-xylylene glycol comprising mixing in a non-metallic reaction zone p-xylylene dichloride with an aqueous solution of potassium chloride, potassium acetate in a concentration in said reaction zone of 0.1 to 4 molar, and p-xylylene glycol obtained as hereinafter described at a pH within the range of 7 to 10, maintaining the reaction mixture at a temperature of 100 to 150° C. for a time of 5 to 100 hours, adding an aqueous solution of potassium hydroxide to the reaction mixture to hydrolyze esters formed, cooling the resulting mixture to crystallize a portion of the glycol and potassium chloride therein, returning at least a portion of the liquid phase recovered from the crystallizer to the reaction zone, drying crystallized glycol and potassium chloride, extracting dried glycol and potassium chloride with xylene to provide a solution of the glycol, separating the solution of glycol from the solid potassium chloride, and recovering the glycol from the xylene solution.

References Cited in the file of this patent

UNITED STATES PATENTS

| | | |
|---|---|---|
| 1,306,221 | Ellis | June 10, 1919 |
| 2,221,882 | Rosenberg | Nov. 19, 1940 |
| 2,399,716 | Adams | May 7, 1946 |
| 2,407,182 | Sievenpiper | Sept. 3, 1946 |
| 2,485,125 | Wilkinson | Oct. 18, 1949 |
| 2,537,622 | Butler | Jan. 9, 1951 |
| 2,856,375 | Mikeska | Oct. 14, 1958 |

OTHER REFERENCES

Quelet: Chem. Abstracts, vol. 27 (1933), p. 3703.
Rhoad et al.: Jour. Amer. Chem. Soc., vol. 72 (1950), pp. 2216–19.